Sept. 24, 1929.  L. A. BIEHLER  1,729,414
WEIGHING DEVICE
Filed Aug. 4, 1927
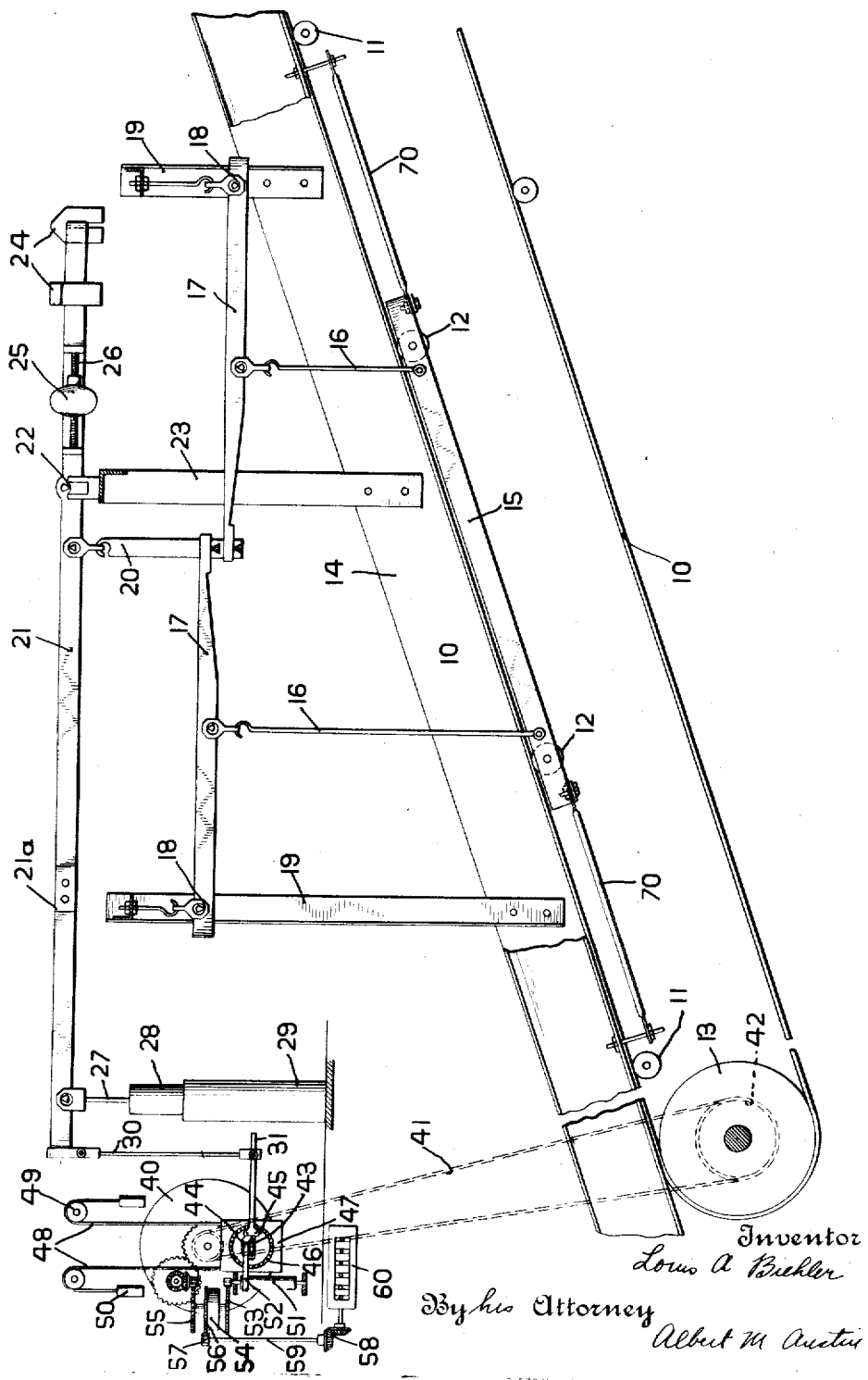
Inventor
Louis A. Biehler
By his Attorney
Albert M. Austin Patented Sept. 24, 1929

1,729,414

UNITED STATES PATENT OFFICE

LOUIS A. BIEHLER, OF STANHOPE, NEW JERSEY

WEIGHING DEVICE

Application filed August 4, 1927. Serial No. 210,499.

This invention relates to a mechanism for continuously weighing material while the material is being transported across a weighing platform and for automatically integrating and registering the weight of the material so transported.

The invention is applicable to weighing material while being transported on any device, such as a belt or bucket conveyor. For purposes of illustration however, it will be described in connection with weighing the load transported by a belt conveyor, which may be taken as a typical conveying mechanism.

In general, the invention comprises a rotating surface, or disc, the speed of rotation of which is a function of the speed of the belt conveyor, and a wheel constantly rotating at right angles to the surface of the disc and frictionally driven thereby, the position of the wheel with respect to the center of rotation of the disc being a function of the load on the scale platform. The wheel drives one side of a differential, the other side being driven in the opposite direction at a speed corresponding to the speed of the wheel at no scale load or zero point. Consequently the differential as a whole rotates in proportion to the combined functions of the belt speed and platform load. Its movement may be recorded by a counter or other suitable device.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which The figure is a diagrammatic showing of the weighing and recording mechanism.

In the following description and in the claims the various parts of the apparatus and details of the invention will be identified by specific names for convenience, but they are intended to be as generic in their application as the art will permit.

Referring to the drawing more in detail, there is shown for purposes of illustrating the invention a conveying belt 10 for transporting the material to be weighed. Belt 10 is supported on idler rollers 11, 11 and 12, 12 and passes around tail pulley 13 and a head pulley not shown, through which it is preferably driven. A suitable platform 14 is provided to support idlers 11. A platform or support 15, forming part of the weighing mechanism and attached to or preferably suspended from the scale beams, is free to move in a vertical direction independently of supports 14 and carries idler rollers 12, 12 in line with idlers 11, which form a portion of the train of roller supports over which conveyor belt 10 moves. This platform 15 with its rollers 12 is herein called the scale platform. Over this the material which is to be weighed in transit is carried by belt 10. Support 15 is preferably hung by means of rods 16 from scale beams 17, which in turn rest on knife edges 18. Said knife edges are supported in any desired manner from platform 14 as by framework 19. The free ends of scale beams 17 are supported by hanger rod 20, which in turn is hung from scale beam 21, pivoted on knife edges 22. Knife edges 22 may be supported from platform 14 as by posts 23. The points of suspension preferably are knife edges, to reduce friction, and antifriction devices may be used throughout the mechanism. Suitable means may be employed for positioning platform 15 such as rods 70 connected between said platform and the platform 14.

On scale beam 21 are one or more counterweights 24 which serve to balance approximately the scale platform and the suspended section of the conveyor when empty. The fine balancing is accomplished by adjustable weight 25 which may be moved with fine adjustment along a threaded rod 26 attached to scale beam 21. The lever and scale mechanism has been shown for convenience as applied to one side only of platform 15 but it will be understood that it is preferably duplicated on the opposite side thereof, the two portions of lever 21 uniting near the end, as at point 21—A.

Near the opposite end of scale beam 21 is a rod 27 by which plunger 28 is hung. This plunger is free to move up and down in a vessel 29 which is partly filled with a damping fluid such as mercury and displaces an amount thereof proportional to the load which at a given moment may be on the suspended portion of the scale.

Scale beam 21 is connected by rod 30 with lever 31 of the integrating apparatus, to be hereinafter described more in detail. The position of rod 30 on scale beam 21 and also on lever 31 is adjustable to permit adjustment of the scale. The size of plunger 28 and its fluid displacement value, may also be varied to accommodate the scale to greater or lesser ranges of load.

The integrating mechanism comprises a disc 40 which is driven through sprocket chain 41 by sprocket wheel 42 attached to the shaft of tail pulley 13 of conveyor belt 10, or which may be otherwise driven in synchronism with said belt. Disc 40 is thereby rotated at varying speeds proportional to the speeds of the belt conveyor.

A wheel or rounded edge friction disc 43 is held at right angles in contact with the face of the disc 40 having its axis normally vertical and intersecting the projected center line of said disc, and being rotated by the disc 40 through frictional contact therewith. A flanged pulley 44 which drives belt 52 may be rigidly attached to wheel 43. This wheel with its shaft is mounted in a circular frame 45 which in turn is mounted on ball bearings 46, carried in sliding frame 47. Frame 45 is tiltable in the plane of frame 47 by means of lever 31 rigidly attached thereto and having its axis preferably extending in the plane of rotation of wheel 43. Frame 47 is held in position parallel to the face of disc 40 by suitable means, not shown, being capable of free vertical movement. Cords or chains 48 attached to frame 47 and passing over sheaves 49 carry counter-weights 50 which balance the weight of the movable parts.

A rotatable drum or pulley 51 of width slightly greater than the maximum vertical movement of wheel 43 and its supporting frames, is mounted with its axis parallel to the normal position of the axis of disc 40 and is driven by wheel 43 through belt 52, said belt being free to move up and down on drum 51 as the wheel 43 may be moved upward or downward vertically in the manner which will be hereafter described. Drum 51 in turn drives one gear 53 of differential 54.

The other gear 55 of differential 54 is driven from disc 40 in the opposite direction through a suitable gear train. The gear ratio should be such that at no load the two gears 53 and 55 will be driven at the same speed but in opposite directions. A gear 56 is mounted on the differential housing and engages and drives pinion 57. This latter in turn drives bevel pinions 58 through shaft 59 thereby driving the counter 60, which may be calibrated to any desired scale.

In operation, the idler rollers 11, 11 and 12, 12 are aligned so that conveyor belt 10 will be straight when empty. With the conveyor running without load, the scale is balanced, first approximately by shifting counterpoise weights 24 back and forth on scale beam 21, and then exactly by the fine adjustment 25. When the scale is in adjustment the counter of integrator 60 remains stationary since the two driving gears of differential 54 are driven at equal speed but in opposite directions.

The material to be weighed is now fed onto conveyor 10 in any desired way, and as it is carried over the scale platform 15 its weight causes levers 17 to be correspondingly actuated, in turn tilting scale beam 21 and causing plunger 28 to move downward in vessel 29 where it displaces an amount of fluid proportional to the load at that instant passing over the scale platform. Simultaneously the end of lever 31 to which rod 30 is attached is also depressed to a degree proportional to the load on the scale platform, thereby causing wheel 43 to be tilted from its horizontal position. Wheel 43 thereupon moves outwardly toward the periphery of disc 40.

When wheel 43 has moved a sufficient distance, corresponding to the depression of lever 31, it again assumes a horizontal position and continues its rotation in a plane tangent to a new circle on disc 40, and is then rotated at an increased speed which corresponds to the load on the scale platform.

Gear 53 of differential 54 is then driven faster than gear 55, causing gear 56 to rotate at a speed which is a function both of the speed conveyor belt and of the load on the scale platform. When the load on the scale platform again varies, lever 31 is raised or depressed to a corresponding degree by the lever mechanism, causing wheel 43 to assume a new position and again to rotate at a speed corresponding to the new load. Counter 60 is actuated by movement of the differential housing and thereby records the amount of material transported over the scale. Said counter of course, may be calibrated to read in any desired units.

Although a particular type of differential has been disclosed herein, it is obvious that any suitable means may be employed for compensating for the rotation of the friction disc at a speed corresponding to zero load on the belt. The differential is illustrative only and the term differential in the claims is intended to cover any compensating mechanism in which differential movement is involved.

The arrangement above described provides for continuously weighing and recording the quantity of material passing over the scale platform without in any way interfering with the operation of the conveyor system. The mechanism is simple to install and repair thereby avoiding the necessity of skilled operators.

The material to be weighed may flow in an even stream or may be passed across the weighing platform in an irregular load varying from nothing to the maximum capacity of the scale without appreciably affecting the smoothness and accuracy of the weighing operation.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. A mechanism for weighing material being transported by a conveyor, comprising a disc, means for rotating said disc at a speed proportional to the speed of said conveyor, a friction wheel mounted in contact with said disc and adapted to be rotated thereby, said wheel normally rotating with its axis parallel to a radius of said disc, means for angularly varying said axis in accordance with the instantaneous weight of material on a portion of said conveyor whereby said friction wheel tends to move radially of said disc until the axis of rotation thereof again becomes parallel with the radius of said disc, a differential mechanism including a pair of gears, means for rotating one of said gears at a speed proportional to the speed of said disc, means for rotating the other of said gears in the opposite direction at a speed proportional to that of said friction wheel, indicating mechanism associated with said differential, said elements being so related that no movement of said indicating device will take place when said instantaneous load becomes zero.

2. An automatic weigher comprising a framework, rollers supported thereby, a scale mechanism, a scale platform carrying rollers and forming a part of said scale mechanism, said platform being capable of limited vertical movement independently of said framework and being placed between rollers on said framework, a conveyor adapted to travel over said rollers for transporting the material to be weighed, a rotating disc, means for rotating said disc in synchronism with the speed of a conveyor, a wheel rotatable at right angles to the surface of said disc and frictionally driven thereby and adapted to be moved toward and away from the center of rotation of said disc, means actuated by said scale mechanism for angularly varying the axis of said wheel whereby the disc causes said wheel to move radially thereof proportionally to the load applied to said scale mechanism, a differential, means for causing one side of the differential to be driven in synchronism with said wheel, means for causing the other side of said differential to be driven at a fixed speed ratio with respect to said disc and in the opposite direction to the first side, whereby the net rotation of said differential varies with the speed and loading of said conveyor belt, and means for recording said rotation in terms of the load conveyed.

3. Mechanism for weighing material being transported by a continuous conveyor, comprising a platform adapted to be operated in accordance with instantaneous weight of the material and said conveyor, scale beams associated therewith, an element movable in accordance with the speed of said conveyor, a second element and means for moving said second element as a function of the speed of the conveyor and of the instantaneous weight of the material, comprising a disc rotatable proportionally to the speed of the conveyor, a friction wheel adapted to bear against the face of the said disc, a support therefor, means for mounting said support whereby the axis of said wheel may be angularly varied, an arm associated with said support, and means for angularly moving said arm in accordance with the position of said scale beams whereby the angular position of the axis of said wheel is varied, and the wheel is caused to travel radially of said disc by the rotation of the disc itself until its axis becomes parallel to a radius of said disc, and means operable in accordance with the difference in speed of said first and second elements for indicating the weight of the material on said conveyor.

In testimony whereof I have hereunto set my hand.

LOUIS A. BIEHLER.